Aug. 12, 1924.

A. J. BASTIAN 1,504,596

GEAR WHEEL

Filed Sept. 13, 1919

WITNESSES:
J. A. Helsel
U. W. Woodman

INVENTOR
Arthur J. Bastian.
BY
Wesley J. Carr
ATTORNEY

Patented Aug. 12, 1924.

1,504,596

UNITED STATES PATENT OFFICE.

ARTHUR J. BASTIAN, OF EDGEWOOD PARK, PENNSYLVANIA, ASSIGNOR TO WESTINGHOUSE ELECTRIC & MANUFACTURING COMPANY, A CORPORATION OF PENNSYLVANIA.

GEAR WHEEL.

Application filed September 13, 1919. Serial No. 323,591.

*To all whom it may concern:*

Be it known that I, ARTHUR J. BASTIAN, a citizen of the United States, and a resident of Edgewood Park, in the county of Allegheny and State of Pennsylvania, have invented a new and useful Improvement in Gear Wheels, of which the following is a specification.

My invention relates to gear wheels and other machine elements or hubbed elements and it has, for its primary object, the provision of a gear wheel comprising a self-sustaining working body portion, of fibrous or porous material, and a hardened binder, of improved and superior construction.

Heretofore, gear wheels have been formed by superimposed layers of fibrous sheet material, such as duck or paper, impregnated with a binder, preferably one which may be hardened by the application of heat and pressure, such as a phenolic condensation product. Assembled gear bodies of this character have been cured under heat and pressure, either to the exact shape of the desired gears or in the shape of gear blanks from which the gears have been subsequently milled.

Gears of this character have been very satisfactory, but I have found that a gear wheel or other machine element possessing somewhat greater resiliency that has been previously obtained in the manufacture of such composite gears is very desirable in certain fields of application.

My present invention, therefore, resides in the provision of a gear wheel or other machine element, of composite heat-hardened material, which shall possess unusual resiliency without sacrificing, to any material extent at least, the advantages of strength, hardness and the capacity to resist absorption of moisture and oils possessed by gears of this general type as previously manufactured.

Figure 1:
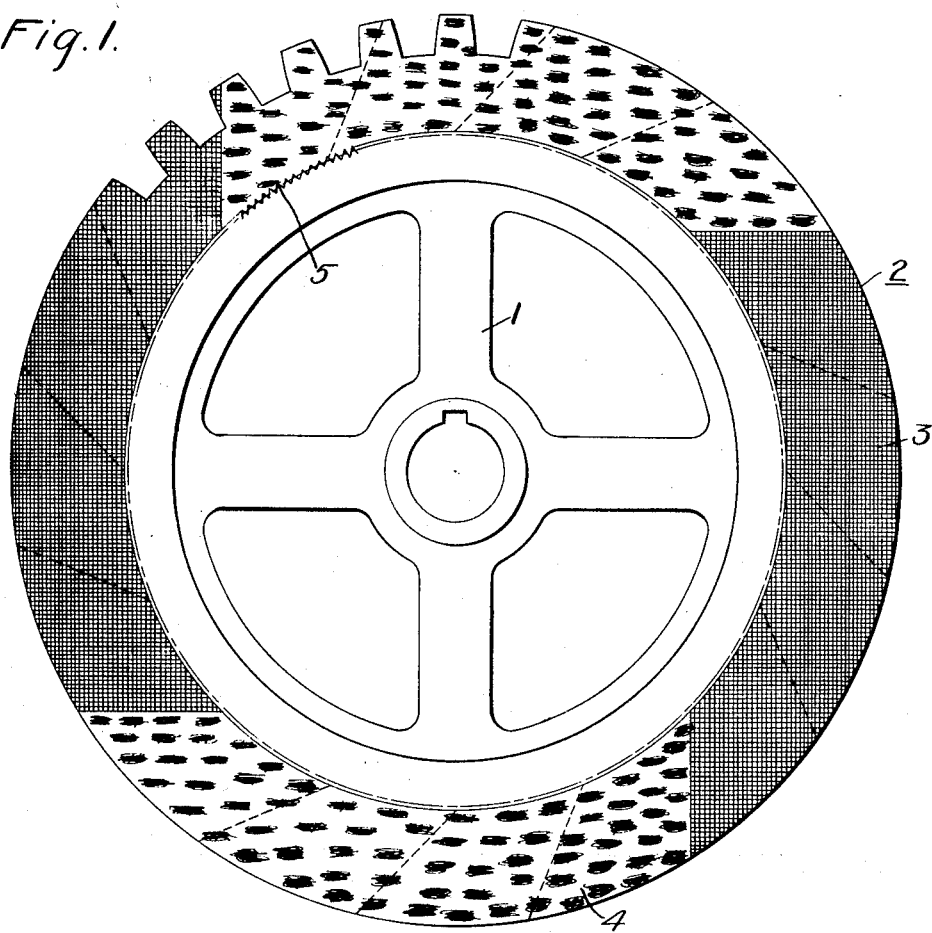
Figure 2:
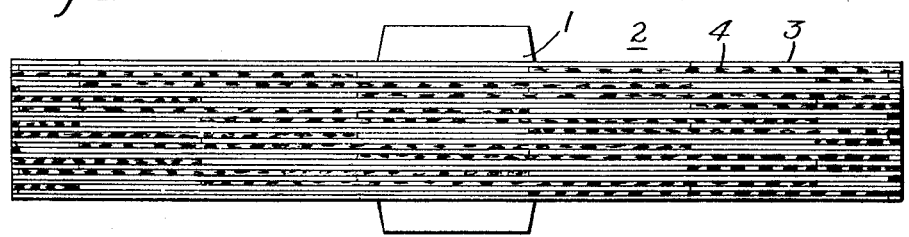

In the accompanying drawing, Fig. 1 is a side elevational view of a gear wheel constructed in accordance with my invention, the outer layer of the material comprising the working body portion of the gear having been removed to more fully disclose the construction and Fig. 2 is a plan view of a gear blank from which the gear shown in Fig. 1 may be formed.

In practising my invention, I may employ any suitable binder such as shellac, copal or other varnish gum or gum resin, but I preferably employ binders which may be hardened under heat and pressure, such as synthetic resins, as, for example, the well known condensation products of phenols and formaldehyde.

With the binders, I may employ layers or laminations of suitable sheet materials of different characters. For example, a preferred filler may comprise layers of a woven fabric, such as duck, with interposed layers or portions of layers of a more resilient material, such as sheet cork.

Preferably, each layer will comprise a plurality of segments so arranged that the segments of adjacent layers break joint with each other and, if this is the case, the cork segments will preferably be staggered relative to the duck segments in such manner that no portion of any cork segment will engage any portion of another cork segment.

Preferably, the two sheet materials being employed will be impregnated with a binder, such as phenolic condensation product, and dried to facilitate handling and also to drive the solvent or vehicle off the binder. The sheets will then be cut or otherwise divided into segments of the proper size and shape and the segments will be superimposed to provide a working body portion of suitable thickness, care being taken to suitably stagger the cork segments during this assembling.

The working body portion thus assembled will then be molded, either by itself or upon a suitable central support, which may be of metal. The molding may be performed by subjecting the body to the simultaneous application of heat and pressure to compact and shape it and to harden the binder. After the gear blank, either with or without its hub or spider, has been thus formed, teeth may be cut in its periphery by any suitable or desired means.

Referring more particularly to the drawings, I have illustrated a spur gear wheel comprising a central support, hub or spider 1, mounted upon which is a working body portion 2, in the form of a toothed gear ring. Obviously, however, the entire gear wheel may be formed of the material comprising the working body portion 2 of the gear illustrated.

The working body portion of the gear ring 2 may preferably comprise a plurality of segments 3 of duck or other woven fabric and a plurality of segments 4 of sheet cork, both sheet materials being impregnated with the binder. As is clearly indicated in Figs. 1 and 2, the various segments of the duck and cork are so staggered that the several segments of each layer break joint with those of adjacent layers. Furthermore, the cork segments may preferably be disposed in such manner that no portion of any one cork segment will be in engagement with any portion of another cork segment. The object of this staggering is to maintain uniformity of strength throughout the body of the gear ring and to distribute as uniformly as possible, the more resilient cork segments among the stronger duck segments.

Preferably, the assembled gear ring is molded directly upon the hub or spider 1 to insure a strong bond between them and, if this is the case, the peripheral portion of the spider may be roughened in any suitable manner, as shown conventionally at 5.

From the foregoing description, it will be clear that a gear wheel constructed in accordance with my present invention will combine, to a considerable extent, the strength of the woven fabric with the resiliency of the cork so that, for some purposes, the gear wheel will be extremely desirable.

Although I have spoken only of the employment of a woven sheet material, such as duck, with sheet cork, it will be appreciated that other suitable fibrous sheet materials, such as paper, may be substituted for the woven sheet material. For this reason, no limitations are to be imposed upon my invention other than those indicated in the claims.

I claim as my invention:

1. A machine element having a working body portion comprising superimposed layers of sheet material associated with a heat hardened binder, certain of the sheet material comprising a woven fabric and certain of the sheet material comprising cork.

2. A machine element having a working body portion comprising a plurality of superimposed layers of sheet material associated with a phenolic condensation product as a binder, a major portion of the sheet material being of woven fabric and a minor portion thereof being cork.

3. A gear wheel comprising a working body portion of superimposed layers of sheet material associated with a phenolic condensation product, the several layers comprising a plurality of assembled segments, certain of the segments being of duck and certain of them of cork, the segments being so arranged that each cork segment is entirely surrounded by duck segments.

4. The method of forming a machine element which comprises impregnating sheets of woven fabric and sheets of cork with a binder which may be hardened by heat and pressure, severing segments from the sheets thus treated, superimposing the segments to provide a working body comprising superimposed layers of the sheet material with the cork segments interspersed with the duck segments and with the segments of one layer breaking joint with the segments of adjacent layers and subjecting the body thus assembled to heat and pressure to compact and shape it and harden the binder.

In testimony whereof, I have hereunto subscribed my name this 25th day of Aug., 1919.

ARTHUR J. BASTIAN.